United States Patent
Fujishiro et al.

(10) Patent No.: US 12,537,048 B2
(45) Date of Patent: Jan. 27, 2026

(54) SEMICONDUCTOR DEVICE HAVING MEMORY CELL ARRAY DIVIDED INTO PLURAL MEMORY MATS

(71) Applicant: MICRON TECHNOLOGY, INC., Boise, ID (US)

(72) Inventors: Keisuke Fujishiro, Kanagawa (JP); Yoshifumi Mochida, Kanagawa (JP)

(73) Assignee: Micron Technology, Inc., Boise, ID (US)

( * ) Notice: Subject to any disclaimer, the term of this patent is extended or adjusted under 35 U.S.C. 154(b) by 625 days.

(21) Appl. No.: 17/821,448

(22) Filed: Aug. 22, 2022

(65) Prior Publication Data

US 2024/0062804 A1 Feb. 22, 2024

(51) Int. Cl.
*G11C 11/408* (2006.01)
*G11C 11/4091* (2006.01)
*G11C 11/4097* (2006.01)

(52) U.S. Cl.
CPC ...... *G11C 11/4087* (2013.01); *G11C 11/4091* (2013.01); *G11C 11/4097* (2013.01)

(58) Field of Classification Search
CPC ............ G11C 11/4097; G11C 11/4091; G11C 11/4087

USPC .......................................................... 365/23
See application file for complete search history.

(56) References Cited

U.S. PATENT DOCUMENTS

| | | | |
|---|---|---|---|
| 9,508,456 B1* | 11/2016 | Shim | G11C 17/18 |
| 9,805,828 B1* | 10/2017 | Yoko | G11C 29/702 |
| 10,984,868 B1* | 4/2021 | Ishikawa | G11C 16/08 |
| 11,069,426 B1* | 7/2021 | Wieduwilt | G11C 29/787 |
| 2008/0089150 A1* | 4/2008 | Cho | G11C 29/83 365/225.7 |
| 2013/0315016 A1* | 11/2013 | Park | G11C 29/787 365/200 |
| 2014/0254297 A1* | 9/2014 | Hung | G11C 29/70 365/200 |
| 2015/0063013 A1* | 3/2015 | Iizuka | G11C 11/1675 365/158 |
| 2021/0193195 A1* | 6/2021 | Thyagarajan | G11C 7/08 |
| 2021/0375385 A1* | 12/2021 | Chiang | G11C 29/76 |
| 2022/0028471 A1* | 1/2022 | Shang | G11C 29/36 |

* cited by examiner

*Primary Examiner* — Sung Il Cho
(74) *Attorney, Agent, or Firm* — Dorsey & Whitney LLP

(57) ABSTRACT

An apparatus that includes a plurality of first memory mats each including a plurality of common column sections except for at least one associated column section, the at least one associated column sections being selected by respective column addresses which are different from one another; and a second memory mat including the at least one corresponding column sections therein.

19 Claims, 21 Drawing Sheets

FIG.5A

| CP | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| CS# | 63 | 63 | 63 | 63 | 63 | 63 | 63 | 63 | 63 | 63 | 63 | 63 | 63 | 63 | 63 | 63 |

| CP | 16 | 17 | 18 | 19 | 20 | 21 | 22 | 23 | 24 | 25 | 26 | 27 | 28 | 29 | 30 | 31 | GCR |
|---|---|---|---|---|---|---|---|---|---|---|---|---|---|---|---|---|---|
| CS# | 63 | 63 | 63 | 63 | 63 | 63 | 63 | 63 | 63 | 63 | 63 | 63 | 63 | 63 | 63 | 63 | 64 |

32 Normal +32 Redun

FIG.5B

| CP | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| CS# | 60 | 64 | 64 | 64 | 60 | 64 | 64 | 64 | 60 | 64 | 64 | 64 | 60 | 64 | 64 | 64 |

| CP | 16 | 17 | 18 | 19 | 20 | 21 | 22 | 23 | 24 | 25 | 26 | 27 | 28 | 29 | 30 | 31 | GCR |
|---|---|---|---|---|---|---|---|---|---|---|---|---|---|---|---|---|---|
| CS# | 60 | 64 | 64 | 64 | 60 | 64 | 64 | 64 | 60 | 64 | 64 | 64 | 60 | 64 | 64 | 64 | 64 |

32 Normal +32 Redun

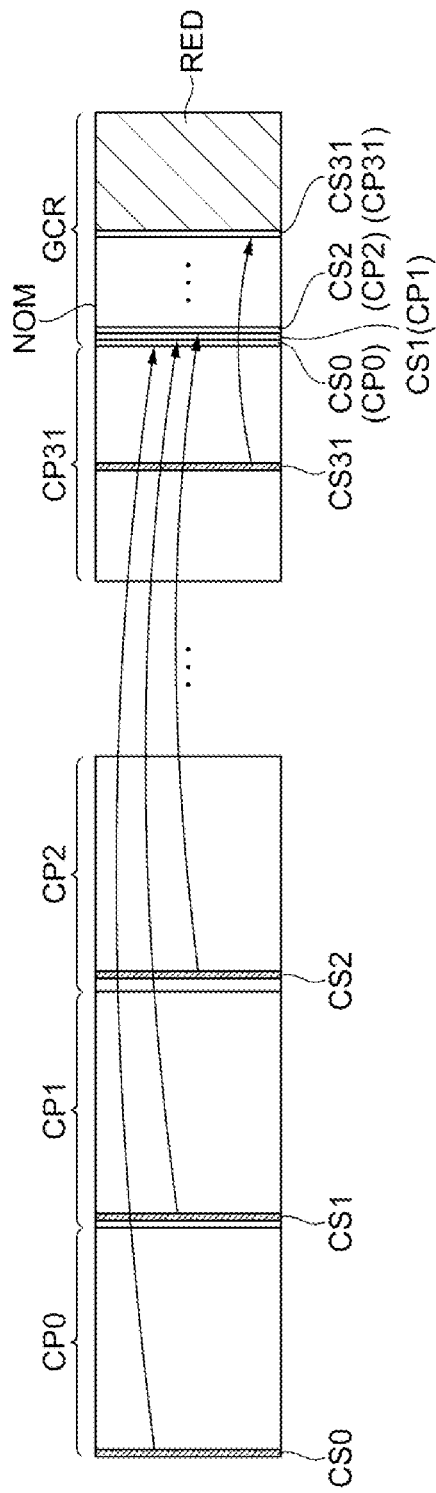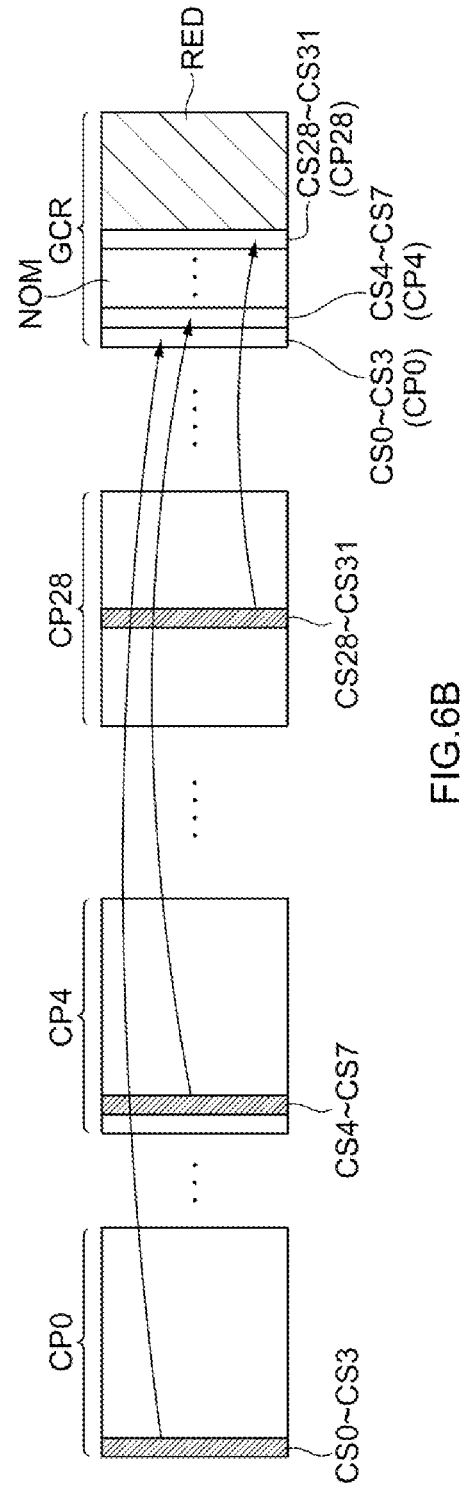

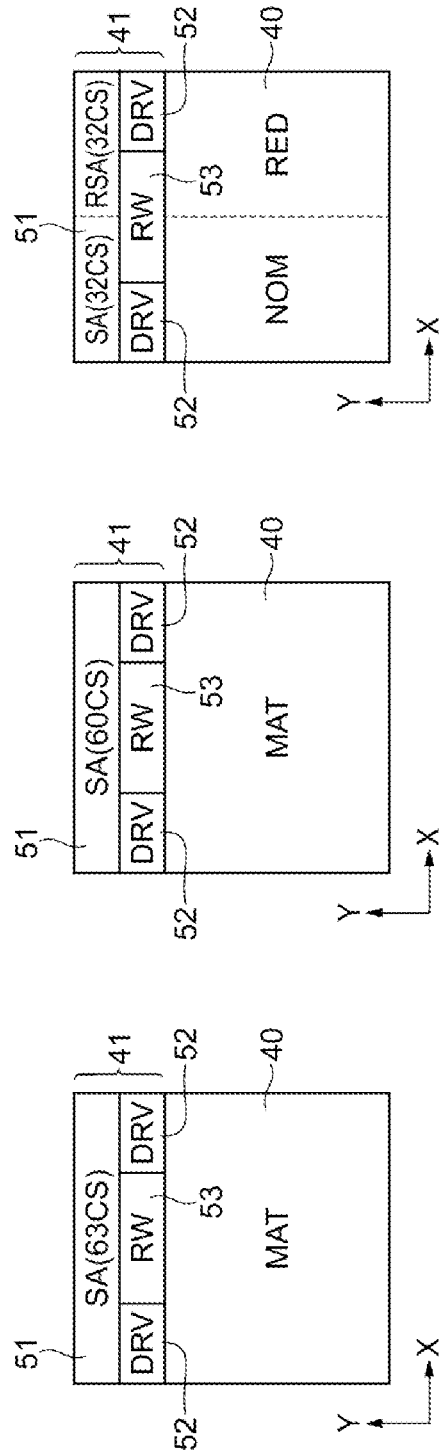

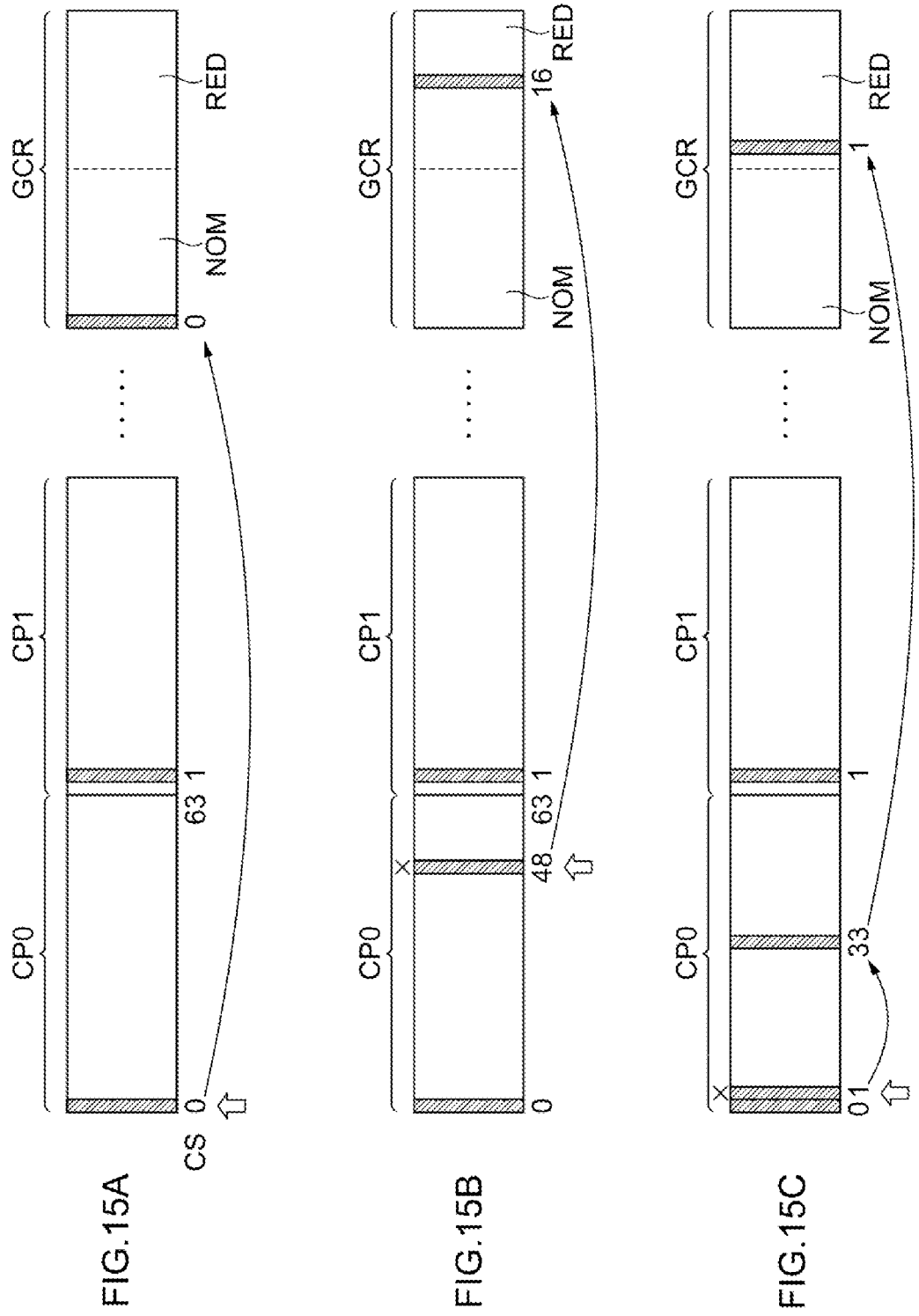

SEMICONDUCTOR DEVICE HAVING MEMORY CELL ARRAY DIVIDED INTO PLURAL MEMORY MATS

BACKGROUND

Some semiconductor memory devices such as a DRAM (Dynamic Random Access Memory) include a memory cell array that is divided into a plurality of memory mats. Some memory mats selected based on a row address are coupled to respectively corresponding global I/O lines. Which bit line in the memory mats is coupled to the corresponding global I/O line is selected based on a column address.

Further, there is a case where the memory cell array includes a redundant memory mat having spare bit lines used for substituting defective bit lines. In this case, when the column size of the redundant memory mat is considerably smaller than the column sizes of other memory mats, the size of a sense amplifier region corresponding to the redundant memory mat becomes insufficient and it is difficult to secure characteristics equivalent to those of the other memory mats.

BRIEF DESCRIPTION OF THE DRAWINGS

FIG. 5A is a schematic diagram for explaining a first example of a concept of a semiconductor memory device according to the embodiment;

FIG. 5B is a schematic diagram for explaining a second example of the concept of the semiconductor memory device according to the embodiment;

FIG. 6A is a schematic diagram for explaining an example of movement of bit lines in the first example shown in FIG. 5A;

FIG. 6B is a schematic diagram for explaining an example of movement of bit lines in the second example shown in FIG. 5B;

FIG. 7A is a schematic diagram showing a shape of a sense amplifier region corresponding to a normal column plane CP0 shown in FIG. 6A;

FIG. 7B is a schematic diagram showing a shape of a sense amplifier region corresponding to the normal column plane CP0 shown in FIG. 6B;

FIG. 7C is a schematic diagram showing a shape of a sense amplifier region corresponding to a mixed column plane GCR shown in FIG. 6A and FIG. 6B;

FIG. 15A to FIG. 15F are schematic diagrams for explaining a column access operation;

DETAILED DESCRIPTION

Various embodiments of the present disclosure will be explained below in detail with reference to the accompanying drawings. The following detailed description refers to the accompanying drawings that show, by way of illustration, specific aspects, and various embodiments of the present disclosure. The detailed description provides sufficient detail to enable those skilled in the art to practice these embodiments of the present disclosure. Other embodiments may be utilized, and structural, logical, and electrical changes may be made without departing from the scope of the present disclosure. The various embodiments disclosed herein are not necessary mutually exclusive, as some disclosed embodiments can be combined with one or more other disclosed embodiments to form new embodiments.

Figure 1:
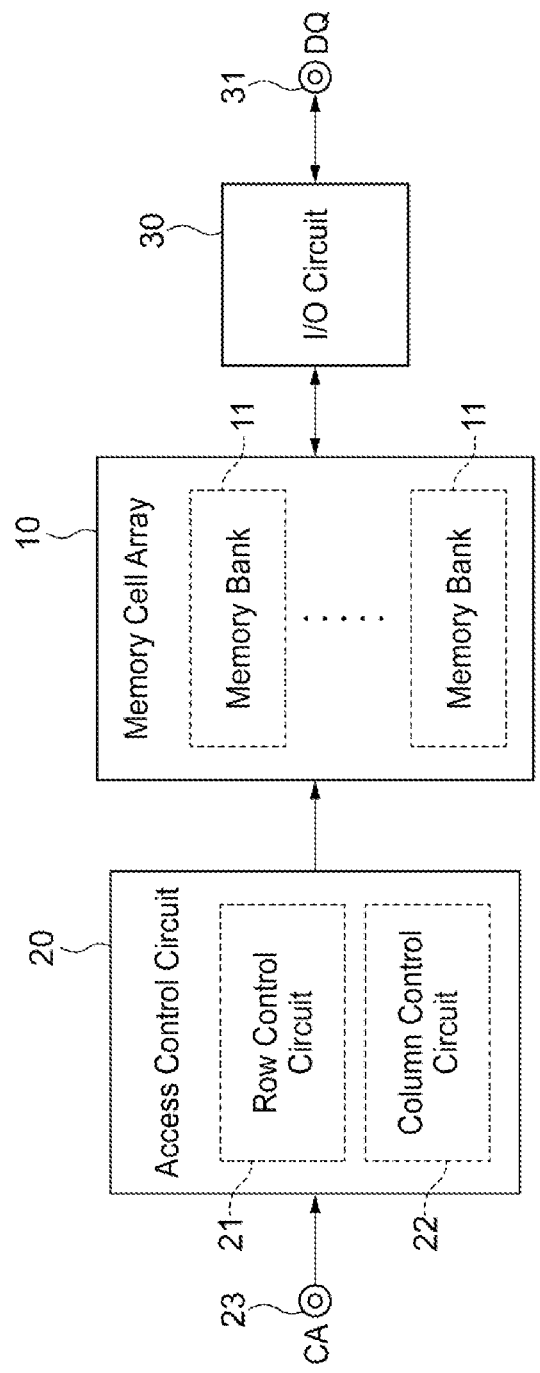
FIG. 1 is a block diagram showing an overall configuration of a semiconductor memory device according to an embodiment of the present disclosure.

FIG. 1 is a block diagram showing an overall configuration of a semiconductor memory device according to an embodiment of the present disclosure. The semiconductor memory device shown in FIG. 1 is a DRAM, for example, and includes a memory cell array 10, an access control circuit 20 that accesses the memory cell array 10, and an I/O circuit 30 that inputs and outputs data to and from the memory cell array 10. The access control circuit 20 includes a row control circuit 21 and a column control circuit 22. The access control circuit 20 accesses the memory cell array 10 based on a command address signal CA input from an external controller via a command address terminal 23. The row control circuit 21 selects a word line based on a row address. The column control circuit 22 selects a bit line based on a column address. At the time of a read operation, read data DQ read from the memory cell array 10 is output to a data I/O terminal 31 via the I/O circuit 30. At the time of a write operation, write data DQ input from an external controller to the data I/O terminal 31 is written in the memory cell array 10 via the I/O circuit 30. The memory cell array 10 includes a plurality of memory banks 11.

Figure 2:
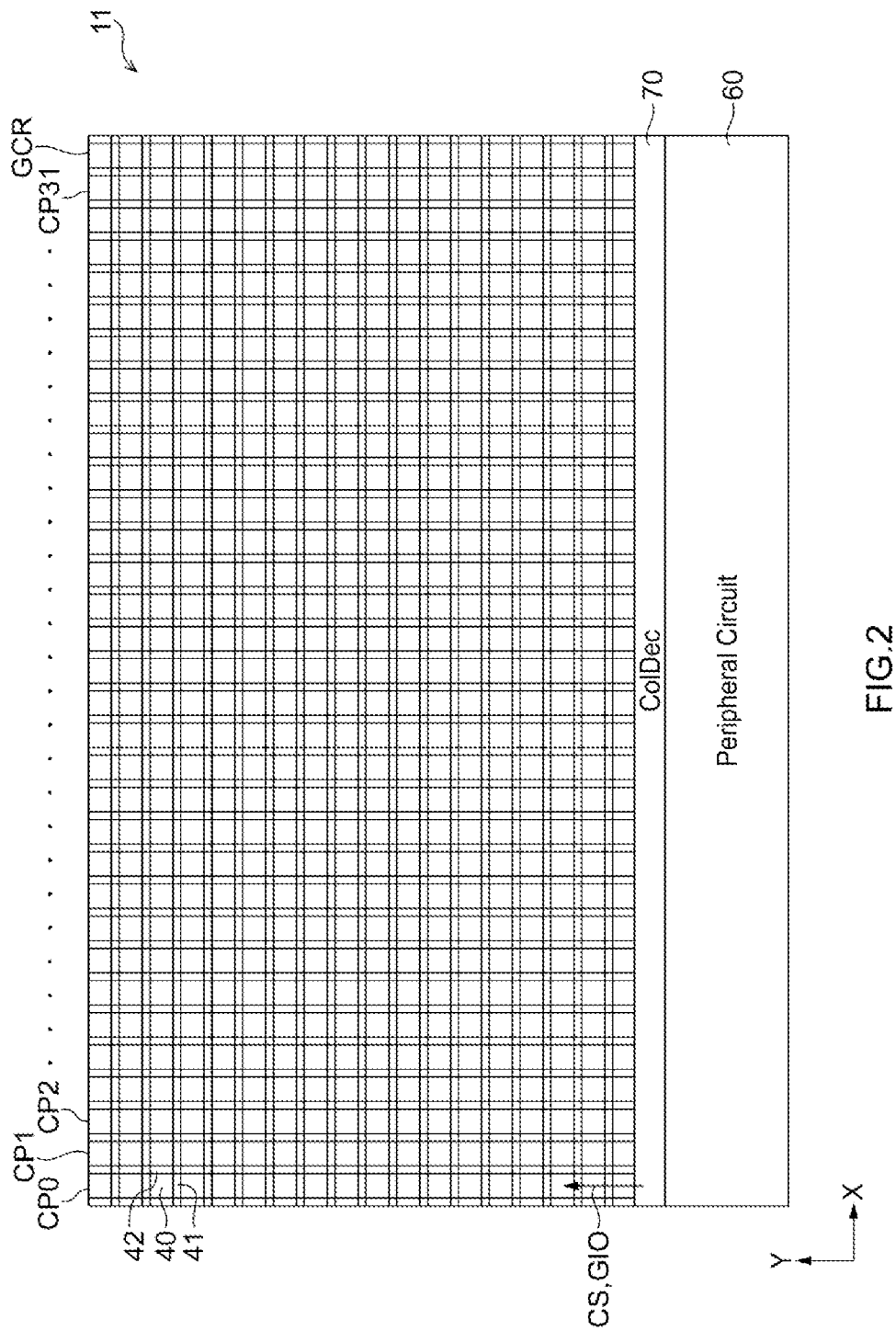
FIG. 2 is a schematic diagram for explaining a configuration of a memory bank.

FIG. 2 is a schematic diagram for explaining a configuration of the memory bank 11. As shown in FIG. 2, the memory bank 11 includes a plurality of memory mats 40 arranged in matrix in the X direction and the Y direction. Sense amplifier regions 41 are arranged on both sides of each memory mat 40 in the Y direction. Word driver regions 42 are arranged on both sides of each memory mat 40 in the X direction. In the example shown in FIG. 2, 33 memory mats 40 are arranged in the X direction. Which memory mat 40 and column thereof are selected is determined based on a higher bit of a row address. The 33 memory mats 40 arranged in the X direction are formed of 32 normal column planes CP0 to CP31 and one mixed column plane GCR. In some examples, the normal column planes CP0 to CP31 and mixed column plane GCR may be referred to as column sections. The mixed column plane GCR includes spare bit lines and defective bit lines BL included in the normal column planes CP0 to CP31 are substituted for spare bit lines in the mixed column plane GCR. A unique global I/O line GIO is assigned to each of the column planes CP0 to CP31 and GCR and mutually the same column selection signal CS is supplied thereto.

Figure 3:
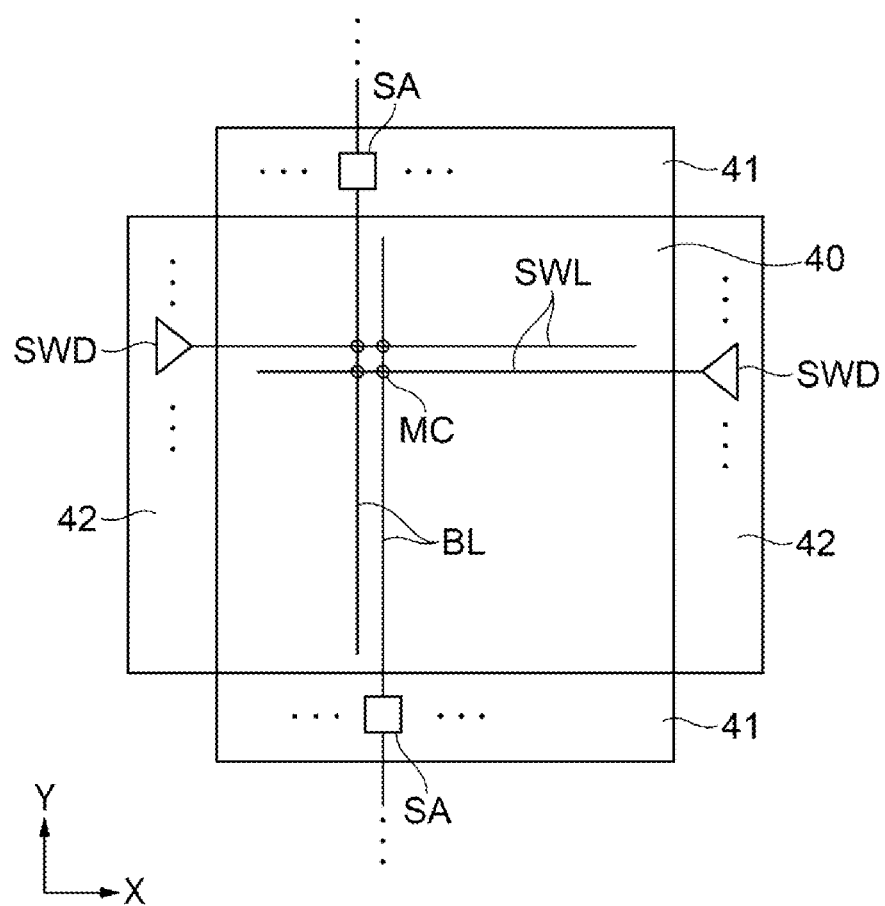
FIG. 3 is a schematic diagram for explaining a configuration of a memory mat.

FIG. 3 is a schematic diagram for explaining a configuration of the memory mat 40. As shown in FIG. 3, a plurality of sub-word lines SWL extending in the X direction, a plurality of bit lines BL extending in the Y direction, and memory cells MC arranged at intersections of the sub-word lines SWL and the bit lines BL are provided in the memory mat 40. The sub-word lines SWL are driven by sub-word drivers SWD arranged in the word driver regions 42 based on a lower bit of a row address. The bit lines BL are coupled to sense amplifiers SA arranged in the sense amplifier regions 41. The sense amplifiers SA are selected based on a column address.

Figure 4A:
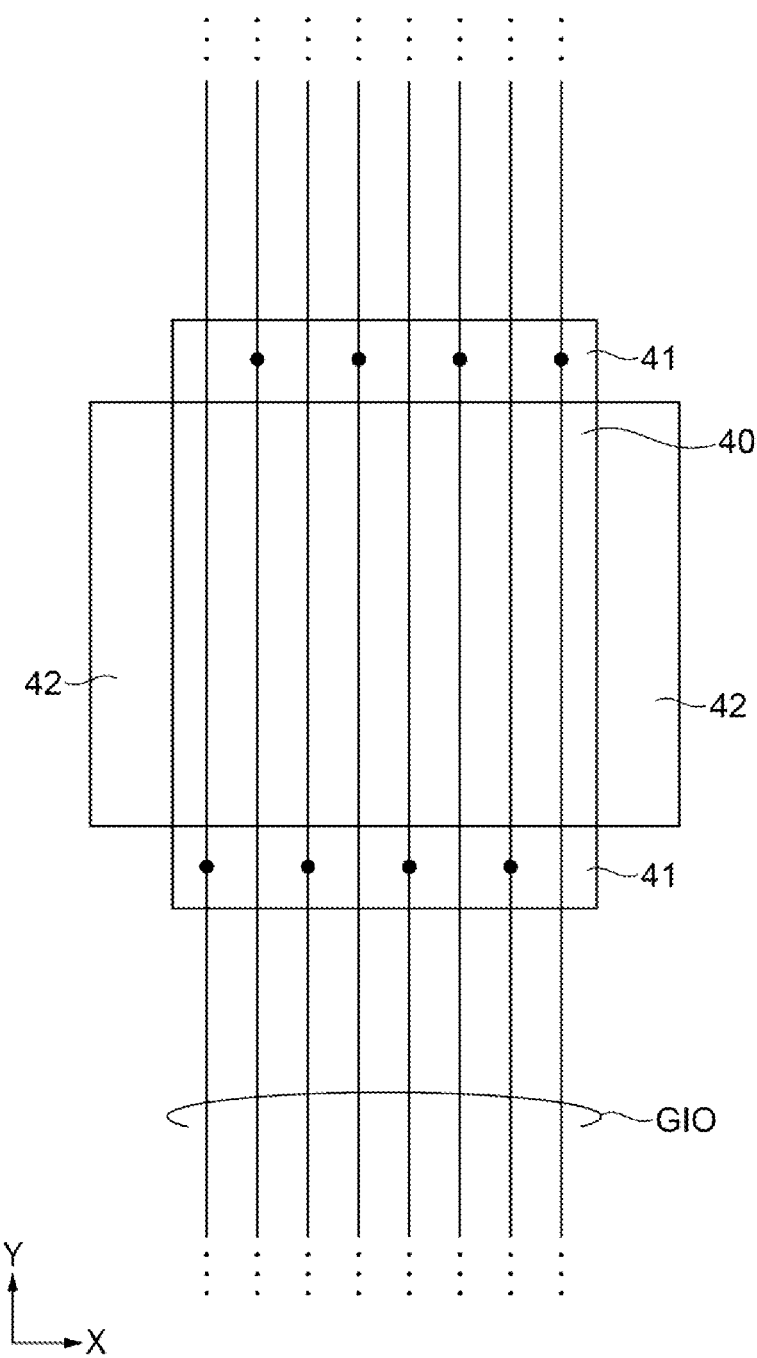
FIG. 4A is a schematic diagram for explaining a relation between sense amplifier regions and global I/O lines.
Figure 4B:
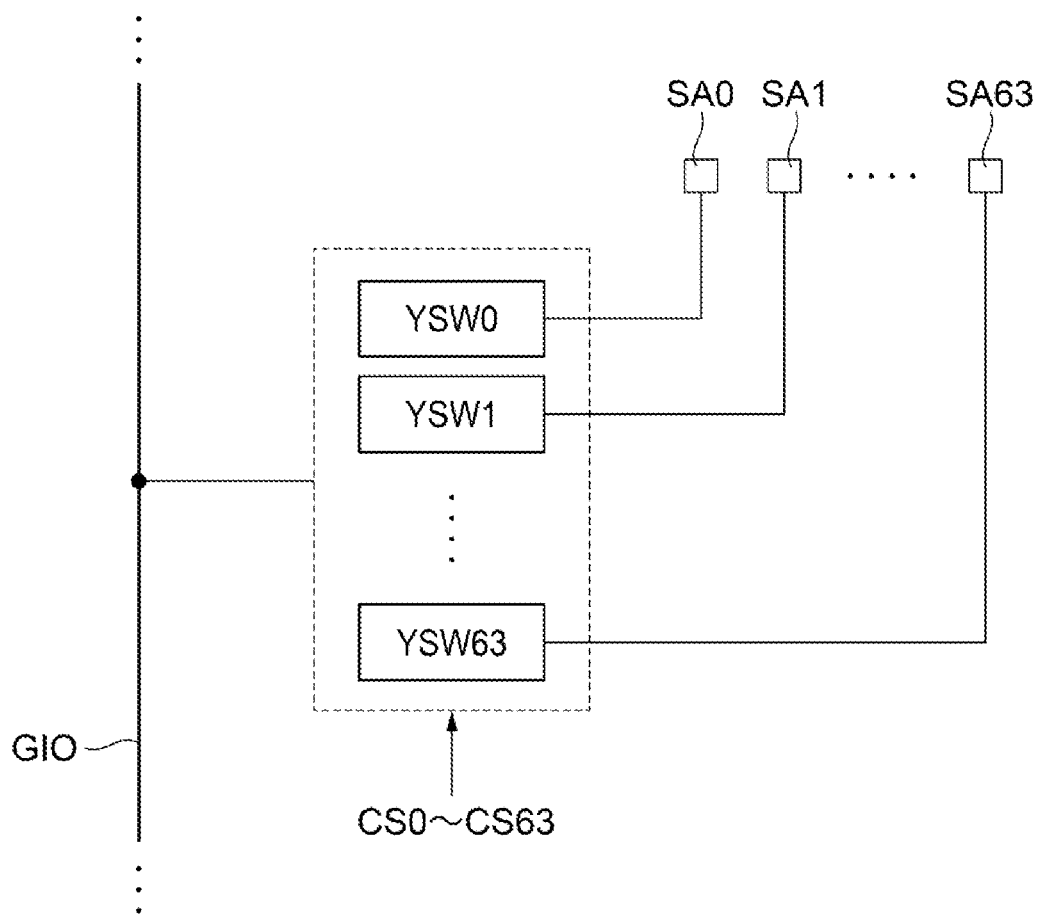
FIG. 4B is a schematic diagram for explaining a coupling relation between sense amplifiers and global I/O lines via a column switch.

FIG. 4A is a schematic diagram for explaining a relation between the sense amplifier regions 41 and global I/O lines GIO. As shown in FIG. 4A, eight global I/O lines GIO are arranged on one memory mat 40. Among the eight global I/O lines GIO, four global I/O lines GIO are coupled to one of the sense amplifier regions 41 and the other four global I/O lines GIO are coupled to the other one of the sense amplifier regions 41. With this configuration, 8-bit data per one memory mat 40 is input and output at the same time. Which one of the sense amplifiers SA each global I/O line GIO is coupled to is selected based on a column address. As an example, the column address is of a 6-bit configuration. In this case, as shown in FIG. 4B, a maximum of 64 column switches YSW0 to YSW63 are assigned to one global I/O line GIO, and as any one of the column switches YSW0 to YSW63 is turned on, any one of sense amplifiers SA0 to SA63 is coupled to the global I/O line GIO. In a normal semiconductor memory device, in each of the normal column planes CP0 to CP31, 64 column switches YSW0 to YSW63 are assigned to one global I/O line GIO. In this case, when the column size of a redundant column plane GCR formed of spare bit lines is the same as that of each of the normal column planes CP0 to CP31, the size of a sense amplifier region 41 corresponding to the redundant column plane GCR in the X direction and the size of the sense amplifier region 41 corresponding to each of the normal column planes CP0 to CP31 in the X direction become the same. However, when the column size of the redundant column plane GCR formed of spare bit lines is significantly different from that of each of the normal column planes CP0 to CP31, such as a case where the column size of the redundant column plane GCR formed of spare bit lines is half of that of each of the normal column planes CP0 to CP31, the size of the sense amplifier region 41 corresponding to the redundant column plane GCR in the X direction becomes considerably smaller than the size of the sense amplifier region 41 corresponding to each of the normal column planes CP0 to CP31 in the X direction. Therefore, the characteristics of a circuit arranged in the sense amplifier region 41 corresponding to the redundant column plane GCR become insufficient.

In the semiconductor memory device according to the present embodiment, by arranging several bit lines BL that are originally supposed to be assigned to the normal column planes CP0 to CP31 in a redundant column plane, the mixed column plane GCR is constituted. For example, in a first example shown in FIG. 5A, as for each of the normal column planes CP0 to CP31, the number of column switches assigned to one global I/O line GIO is reduced from 64 to 63, and the bit line BL corresponding to the one reduced column switch is moved to the mixed column plane GCR. With this process, for one global I/O line GIO, 32 column switches corresponding to spare bit lines and 32 column switches corresponding to bit lines moved from the normal column planes CP0 to CP31 are assigned to the mixed column plane GCR. As a result, the column size of each of the normal column planes CP0 to CP31 and the column size of the mixed column plane GCR become substantially the same, so that the size of the sense amplifier region 41 corresponding to the mixed column plane GCR in the X direction and the size of the sense amplifier region 41 corresponding to each of the normal column planes CP0 to CP31 in the X direction become substantially the same. Alternatively, as illustrated in a second example shown in FIG. 5B, it is also possible to configure that, in each of the normal column planes CP0, CP4, CP8, CP12, CP16, CP20, CP24, and CP28, the number of column switches assigned to one global I/O line GIO is reduced from 64 to 60 and the bit line BL corresponding to the four reduced columns is moved to the mixed column plane GCR. Also in this case, for one global I/O line GIO, 32 column switches corresponding to spare bit lines and 32 column switches corresponding to bit lines moved from the normal column planes CP0, CP4, CP8, CP12, CP16, CP20, CP24, and CP28 are assigned to the mixed column plane GCR. Therefore, the column size of each of the normal column planes CP0 to CP31 and the column size of the mixed column plane GCR become substantially the same.

In the first example shown in FIG. 5A, bit lines BL selected by mutually different column selection signals are selected as the bit lines BL moved from the normal column planes CP0 to CP31. For example, as shown in FIG. 6A, it is permissible to move the bit lines BL respectively corresponding to column selection signals CS0 to CS31 from the normal column planes CP0 to CP31 to the mixed column plane GCR. The remaining bit lines BL included in the mixed column plane GCR are spare bit lines. Further, in the case of the second example shown in FIG. 5B, as shown in FIG. 6B, bit lines BL corresponding to the column selection signals CS0 to CS3 are moved from the normal column plane CP0 to the mixed column plane GCR, bit lines BL corresponding to the column selection signals CS4 to CS7 are moved from the normal column plane CP4 to the mixed column plane GCR, and bit lines BL corresponding to the column selection signals CS28 to CS31 are moved from the normal column plane CP28 to the mixed column plane GCR. The remaining bit lines BL included in the mixed column plane GCR are spare bit lines. With this configuration, the mixed column plane GCR is constituted of a normal region NOM formed of bit lines having been moved from the normal column planes CP0 to CP31 and a redundancy region RED formed of spare bit lines.

Figure 8A:
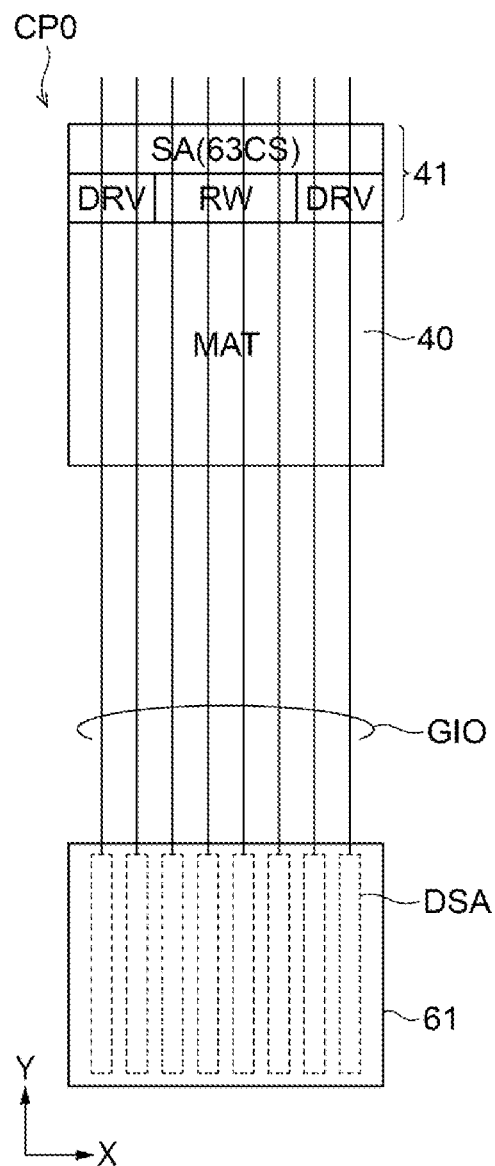
FIG. 8A is a schematic diagram showing a shape of an amplifier region assigned to a normal column plane.
Figure 8B:
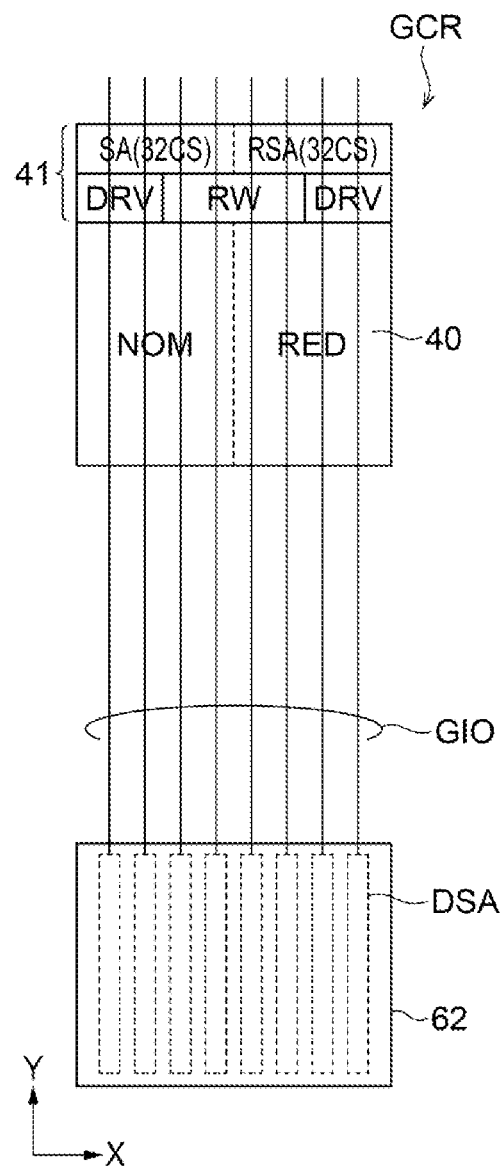
FIG. 8B is a schematic diagram showing a shape of an amplifier region assigned to a mixed column plane.

As shown in FIGS. 7A to 7C, a region 51 in which the sense amplifier SA is arranged, regions 52 in each of which a driver circuit DRV that supplies an operating voltage to the sense amplifier SA is arranged, and a region 53 in which a read/write circuit μW that couples the sense amplifier SA and the global I/O line GIO to each other is arranged are included in the sense amplifier region 41. FIG. 7A is a schematic diagram showing a shape of the sense amplifier region 41 corresponding to the normal column plane CP0 shown in FIG. 6A, FIG. 7B is a schematic diagram showing a shape of the sense amplifier region 41 corresponding to the normal column plane CP0 shown in FIG. 6B, and FIG. 7C is a schematic diagram showing a shape of the sense amplifier region 41 corresponding to the mixed column plane GCR shown in FIGS. 6A and 6B. As shown in FIGS. 7A to 7C, the sizes of the sense amplifier regions 41 respectively corresponding to each of the column planes in the X direction are substantially the same as one another. Therefore, the characteristics of circuits arranged in the sense amplifier regions 41 become substantially the same. Further, as shown in FIGS. 8A and 8B, the size of a driver region 61 assigned to each of the normal column planes CP0 to CP31 in the X direction and the size of a driver region 62 assigned to the mixed column plane GCR in the X direction are also substantially the same. Therefore, the arrangement of data sense amplifiers DSA arranged in the driver region 61 and the arrangement of data sense amplifiers DSA arranged in the driver region 62 can be substantially the same. The driver regions 61 and 62 are arranged in a peripheral circuit region 60 shown in FIG. 2. Further, a column decoder 71, a ROM circuit 72, and a comparing and logic circuit 73 shown in FIG. 9 are arranged in a column decoder region 70 shown in FIG. 2.

Figure 9:
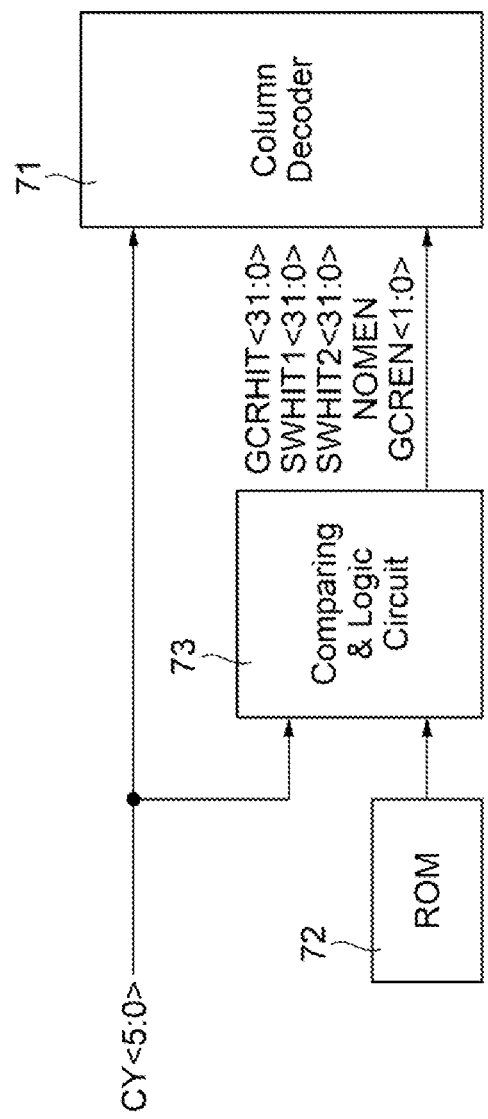
FIG. 9 and FIG. 12 are block diagrams of a circuit arranged in a column decoder region.

As shown in FIG. 9, a 6-bit column address CY<5:0> in binary format is supplied to the column decoder 71 and the comparing and logic circuit 73. Further, addresses and the like of defective bit lines are stored in the ROM circuit 72. The comparing and logic circuit 73 compares a column address CY<5:0> to which access is requested and a column address held in the ROM circuit 72, and based on the comparison result, a hit signal GCRHIT<31:0>, swap signals SWHIT1<31:0> and SWHIT2<31:0>, and an enable signal GCREN<1:0> are generated. Meanwhile, an enable signal NOMEN is activated when a highest-order bit CY5 of a column address to which access is requested is at a low level, regardless of the column address held in the ROM circuit 72. These signals are supplied to the column decoder 71. Each of the hit signal GCRHIT<31:0> and the swap signals SWHIT1<31:0> and SWHIT2<31:0> is a 32-bit signal respectively corresponding to each of the normal column planes CP0 to CP31. When a bit line BL as an accessing target is a defective bit line, the hit signal GCRHIT<31:0> indicates a column plane including the defective bit line. When a part of column address needs to be changed, the swap signals SWHIT1<31:0> and SWHIT2<31:0> indicate a column plane as the changing target.

Figure 10A:
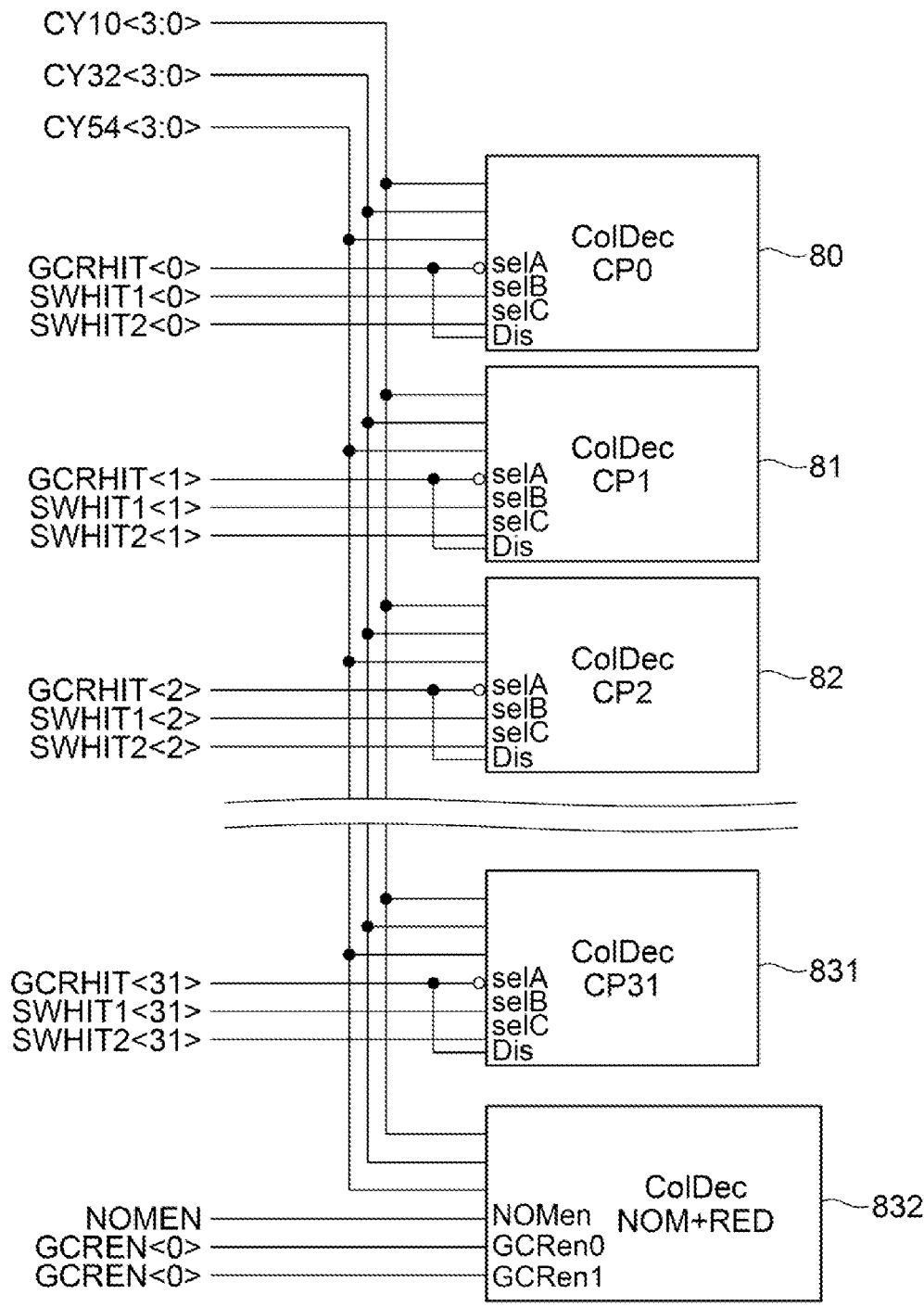
FIG. 10A, FIG. 10B, and FIG. 13 are circuit diagrams of a column decoder.
Figure 10B:
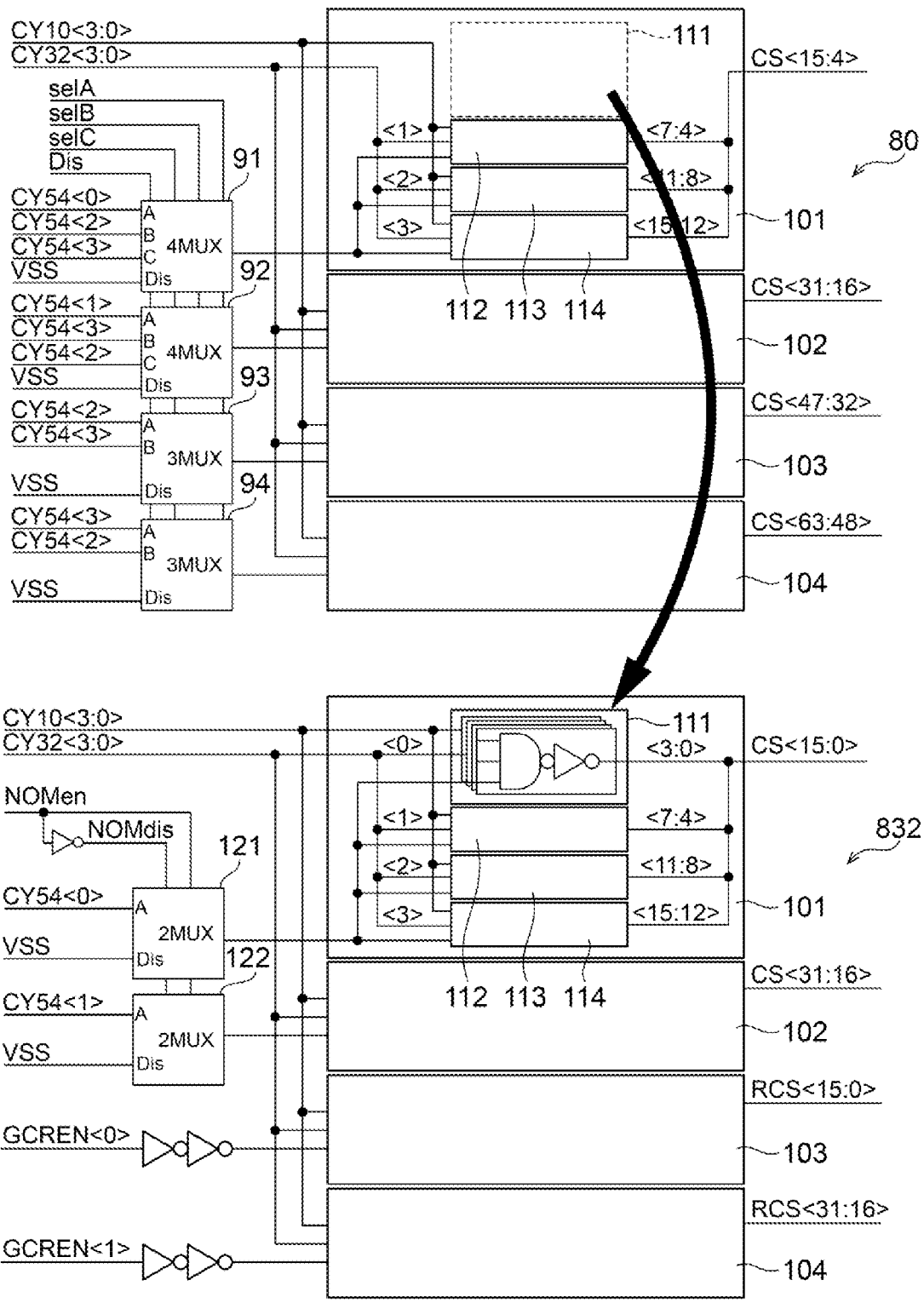

FIGS. 10A and 10B are circuit diagrams of the column decoder 71 and show a case where the normal column planes CP0 to CP31 have the configurations shown in FIGS. 5B and 6B. As shown in FIG. 10A, the column decoder 71 includes decoder circuits 80, 81, 82, . . . , 831, and 832 respectively corresponding to the normal column planes CP0 to CP31 and the mixed column plane GCR. A decode signal CY10<3:0> obtained by decoding column addresses CY0 and CY1, a decode signal CY32<3:0> obtained by decoding column addresses CY2 and CY3, and a decode signal CY54<3:0> obtained by decoding column addresses CY4 and CY5 are commonly supplied to each of the decoder circuits 80, 81, 82, . . . , 831, and 832. Further, bits respectively corresponding to the hit signal GCRHIT<31:0> and the swap signals SWHIT1<31:0> and SWHIT2<31:0> are supplied to the decoder circuits 80, 81, 82, . . . , and 831. The enable signal NOMEN, an enable signal GCREN<0>, and an enable signal GCREN<1> are supplied to the decoder circuit 832 corresponding to the mixed column plane GCR. As shown in FIG. 10B, the decoder circuit 80 corresponding to the normal column plane CP0 includes multiplexers 91 to 94 and decoder circuits 101 to 104.

When a hit signal GCRHIT<0> to be supplied to a selection node selA is at a low level, the multiplexer 91 selects a decode signal CY54<0>. When a swap signal SWHIT1<0> to be supplied to a selection node selB is at a high level, the multiplexer 91 selects a decode signal CY54<2>. When a swap signal SWHIT2<0> to be supplied to a selection node selC is at a high level, the multiplexer 91 selects a decode signal CY54<3>. When the hit signal GCRHIT<0> to be supplied to a disable node Dis is at a high level, the multiplexer 91 selects a VSS level (a low level). The selected signals are commonly supplied to driver circuits 112 to 114 that are included in the decoder circuit 101. When an output signal from the multiplexer 91 is at a high level, in the driver circuits 112 to 114, any one of the column selection signals CS4 to CS15 is activated based on the decode signals CY10<3:0> and CY32<3:0>. As described above with reference to FIG. 6B, since any bit line BL corresponding to the column selection signals CS0 to CS3 is not included in the normal column plane CP0, a driver circuit 111 that activates any one of the column selection signals CS0 to CS3 is omitted. Although not shown in the drawings, in the decoder circuit 101 corresponding to the normal column plane CP4, the driver circuit 112 is omitted, in the decoder circuit 101 corresponding to the normal column plane CP8, the driver circuit 113 is omitted, and in the decoder circuit 101 corresponding to the normal column plane CP12, the driver circuit 114 is omitted.

When the hit signal GCRHIT<0> to be supplied to the selection node selA is at a low level, a multiplexer 92 selects a decode signal CY54<1>. When the swap signal SWHIT1<0> to be supplied to the selection node selB is at a high level, the multiplexer 92 selects the decode signal CY54<3>. When the swap signal SWHIT2<0> to be supplied to the selection node selC is at a high level, the multiplexer 92 selects the decode signal CY54<2>. When the hit signal GCRHIT<0> to be supplied to the disable node Dis is at a high level, the multiplexer 92 selects the VSS level (a low level). The selected signals are supplied to a decoder circuit 102. Although not shown in the drawings, the decoder circuit 102 includes the driver circuits 111 to 114 and when an output signal from the multiplexer 92 is at a high level, any one of column selection signals CS16 to CS31 is activated based on the decode signals CY10<3:0> and CY32<3:0>. Although not shown in the drawings, in the decoder circuit 102 corresponding to the normal column plane CP16, the driver circuit 111 is omitted, in the decoder circuit 102 corresponding to the normal column plane CP20, the driver circuit 112 is omitted, in the decoder circuit 102 corresponding to the normal column plane CP24, the driver circuit 113 is omitted, and in the decoder circuit 102 corresponding to the normal column plane C1'28, the driver circuit 114 is omitted.

When the hit signal GCRHIT<0> to be supplied to the selection node selA is at a low level, a multiplexer 93 selects the decode signal CY54<2>. When the swap signal SWHIT2<0> to be supplied to the selection node selC is at a high level, the multiplexer 93 selects the decode signal CY54<3>. When the hit signal GCRHIT<0> to be supplied to the disable node Dis is at a high level, the multiplexer 93 selects the VSS level (a low level). The selected signals are supplied to the decoder circuit 103. Although not shown in the drawings, the decoder circuit 103 also includes the driver circuits 111 to 114 and when an output signal from the multiplexer 93 is at a high level, any one of column selection signals CS32 to CS47 is activated based on the decode signals CY10<3:0> and CY32<3:0>.

When the hit signal GCRHIT<0> to be supplied to the selection node selA is at a low level, a multiplexer 94 selects the decode signal CY54<3>. When the swap signal SWHIT2<0> to be supplied to the selection node selC is at a high level, the multiplexer 94 selects the decode signal CY54<2>. When the hit signal GCRHIT<0> to be supplied to the disable node Dis is at a high level, the multiplexer 94 selects the VSS level (a low level). The selected signals are supplied to the decoder circuit 104. Although not shown in the drawings, the decoder circuit 104 also includes the driver circuits 111 to 114 and when an output signal from the multiplexer 94 is at a high level, any one of column selection signals CS48 to CS63 is activated based on the decode signals CY10<3:0> and CY32<3:0>.

The decoder circuit 832 corresponding to the mixed column plane GCR includes multiplexers 121 and 122 and the decoder circuits 101 to 104. When the enable signal NOMEN is at a high level, the multiplexers 121 and 122 respectively select decode signals CY54<0> and CY54<1> and when the enable signal NOMEN is at a low level, the multiplexers 121 and 122 select the VSS level (a low level). An output signal from the multiplexer 121 is commonly supplied to the driver circuits 111 to 114 included in the decoder circuit 101. When the output signal from the multiplexer 121 is at a high level, the driver circuits 111 to 114 activate any one of the column selection signals CS0 to CS15 based on the decode signals CY10<3:0> and CY32<3:0>. Here, the driver circuit 111 that generates the column selection signals CS0 to CS3 corresponds to the driver circuit 111 that is originally supposed to be included in the decoder circuit 80. Similarly, the driver circuit 112 that generates the column selection signals CS4 to CS7 corresponds to the driver circuit 112 that is originally supposed to be included in the decoder circuit 84. The driver circuit 113 that generates the column selection signals CS8 to CS11 corresponds to the driver circuit 113 that is originally supposed to be included in the decoder circuit 88. The driver circuit 114 that generates the column selection signals CS12 to CS15 corresponds to the driver circuit 114 that is originally supposed to be included in the decoder circuit 812.

Although not shown in the drawings, the decoder circuit 102 included in the decoder circuit 832 also includes the driver circuits 111 to 114 and when an output signal from the multiplexer 122 is at a high level, the decoder circuit 102 activates any one of the column selection signals CS16 to CS31 based on the decode signals CY10<3:0> and CY32<3:0>. Here, the driver circuit 111 that generates the column selection signals CS16 to CS19 corresponds to the driver circuit 111 that is originally supposed to be included in the decoder circuit 816. The driver circuit 112 that generates the column selection signals CS20 to CS23 corresponds to the driver circuit 112 that is originally supposed to be included in the decoder circuit 820. The driver circuit 113 that generates the column selection signals CS24 to CS27 corresponds to the driver circuit 113 that is originally supposed to be included in the decoder circuit 820. The driver circuit 114 that generates the column selection signals CS28 to CS31 corresponds to the driver circuit 114 that is originally supposed to be included in the decoder circuit 824.

The decoder circuits 103 and 104 included in the decoder circuit 832 also include the driver circuits 111 to 114 and when the enable signal GCREN<0> is at a high level, the decoder circuit 103 activates any one of redundancy column selection signals RCS0 to RCS15 based on the decode signals CY10<3:0> and CY32<3:0>. When the enable signal GCREN<1> is at a high level, the decoder circuit 104 activates any one of redundancy column selection signals RCS16 to RCS31 based on the decode signals CY10<3:0> and CY32<3:0>.

With this configuration, when a bit line BL as an accessing target is a defective bit line, the mixed column plane GCR is selected instead of the column plane including the defective bit line. In this case, spare bit lines arranged in the redundancy region RED in the mixed column plane GCR are used. Further, when column selection signals CS0 to CS31 are activated, the mixed column plane GCR is selected instead of a column plane not having any corresponding column switch. In this case, bit lines arranged in the normal region NOM in the mixed column plane GCR are used. When the mixed column plane GCR is selected, data bus switching is performed.

Figure 11:
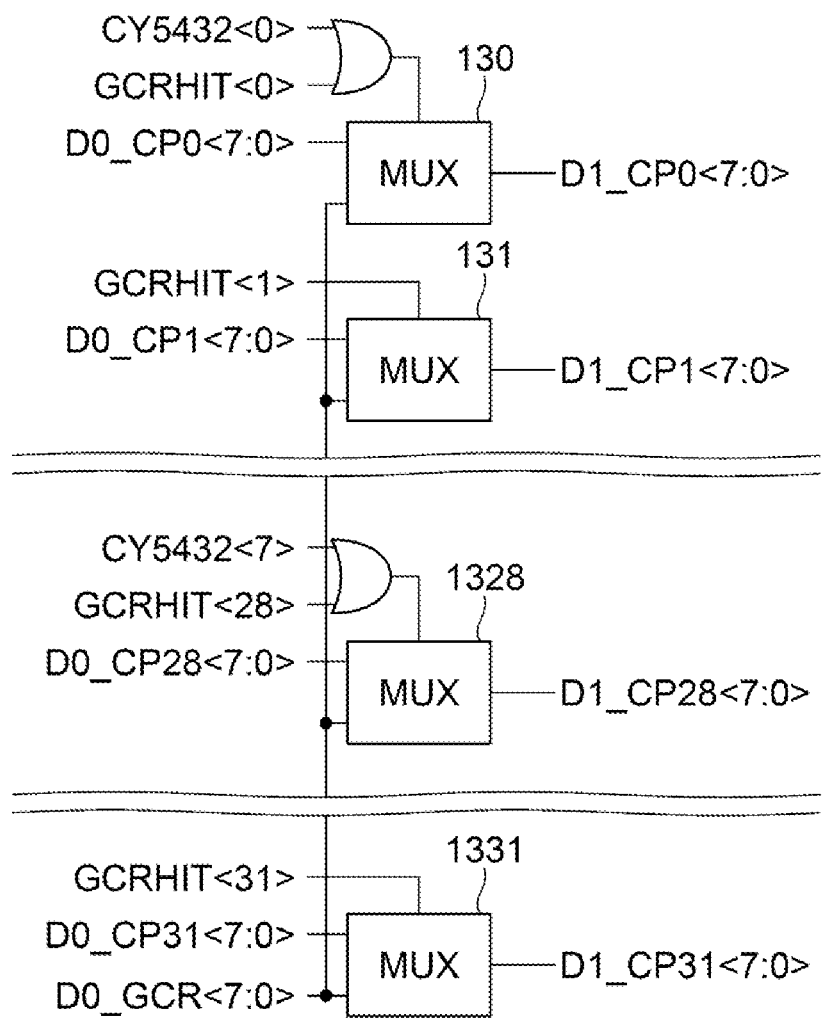
FIG. 11 and FIG. 14 are circuit diagrams showing a data-bus switching circuit.

FIG. 11 is a circuit diagram showing a data-bus switching circuit. As shown in FIG. 11, multiplexers 130 to 1331 provided between a pre-switching section D0 and a post-switching section D1 are coupled to a data bus. The multiplexers 130 to 1331 respectively correspond to the normal column planes CP0 to CP31. The multiplexers 130 to 1331 couple either one of sections D0_CP<7:0> to D0_CP31<7:0> being respectively coupled to the normal column planes CP0 to CP31 and a section D0_GCR<7:0> being coupled to the mixed column plane GCR to post-switching sections D1_CP0<7:0> to D1_CP31<7:0>. In normal column planes including all the column switches corresponding to the column selection signals CS0 to CS63 such as the multiplexer 131 assigned to the normal column plane CP1, the selection is controlled by a corresponding hit signal GCRHIT<1>. In this case, when the corresponding hit signal GCRHIT<1> is activated, the section D0_GCR<'7:0> coupled to the mixed column plane GCR is selected instead of the section D0_CP1<7:0> that is originally supposed to be selected. Meanwhile, normal column planes not having all the column switches corresponding to a part of the column selection signals CS0 to CS63, such as the multiplexer 130 assigned to the normal column plane CP0, are controlled by a corresponding hit signal GCRHIT<0> and a decode signal CY5432<0>. In this case, when the corresponding hit signal GCRHIT<0> is activated or the decode signal CY5432<0> is activated, the section D0_GCR<7:0> coupled to the mixed column plane GCR is selected instead of the section D0_CP0<7:0> that is originally supposed to be selected.

Figure 12:
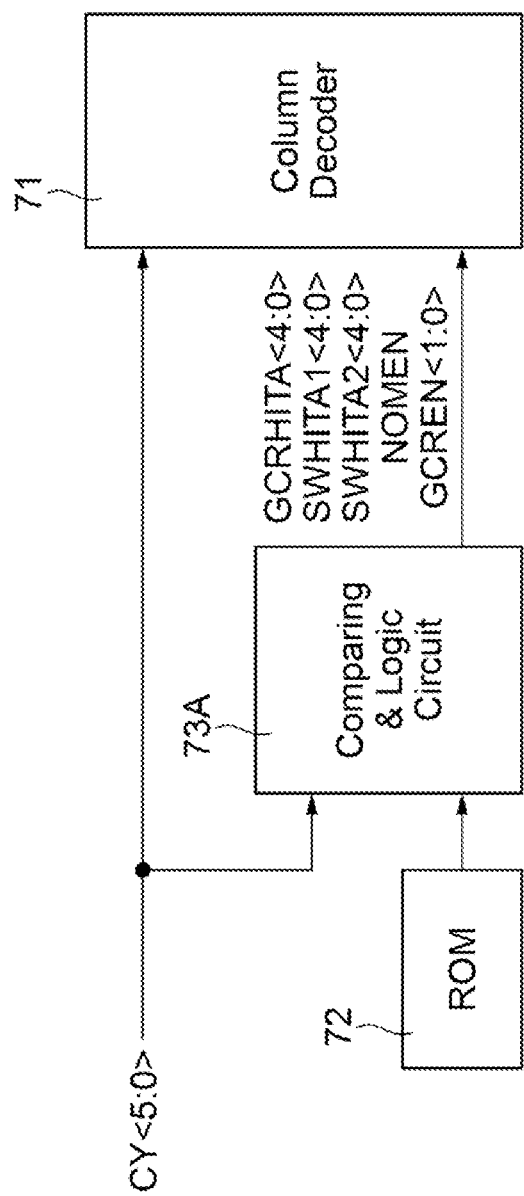
Figure 13:
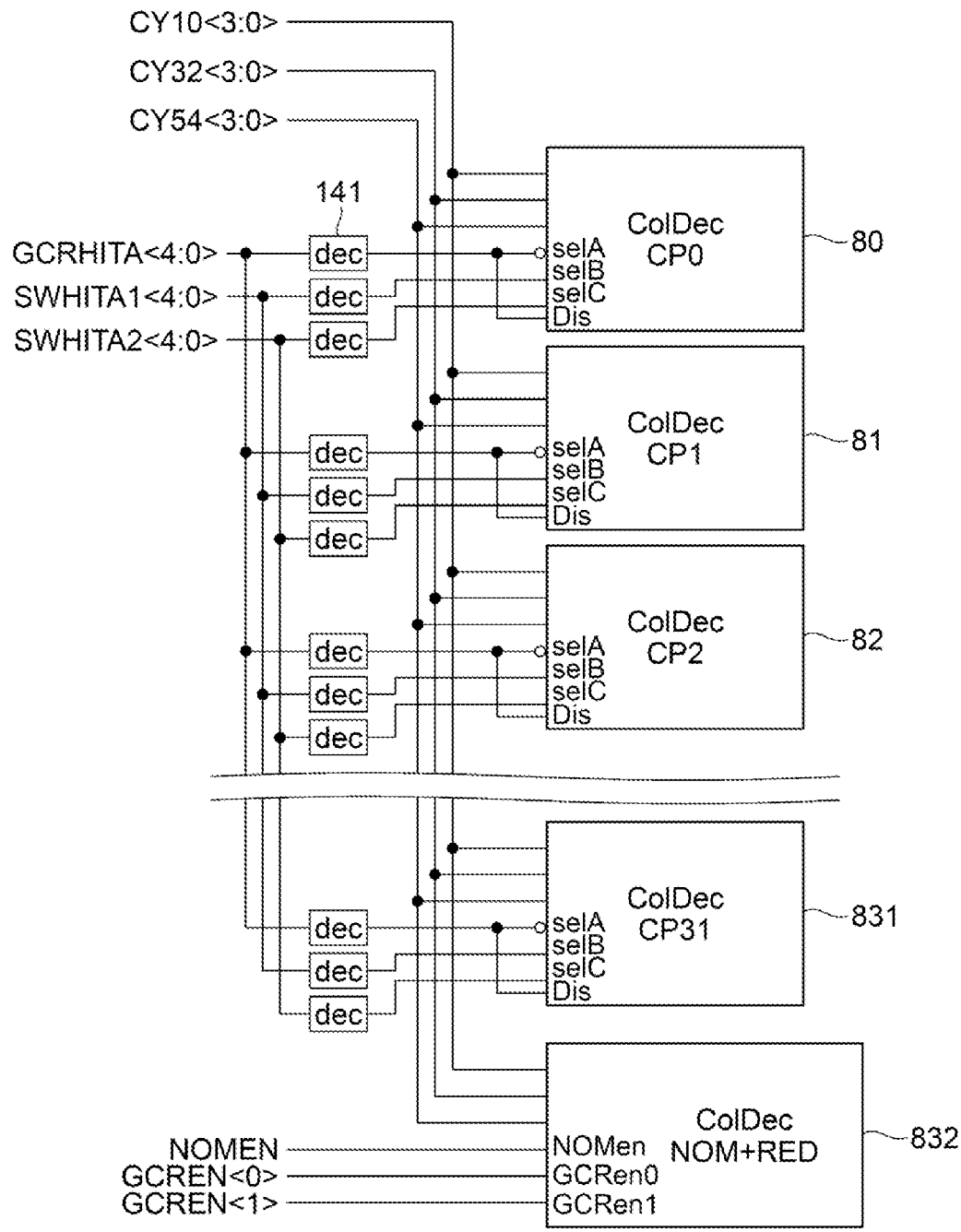
Figure 14:
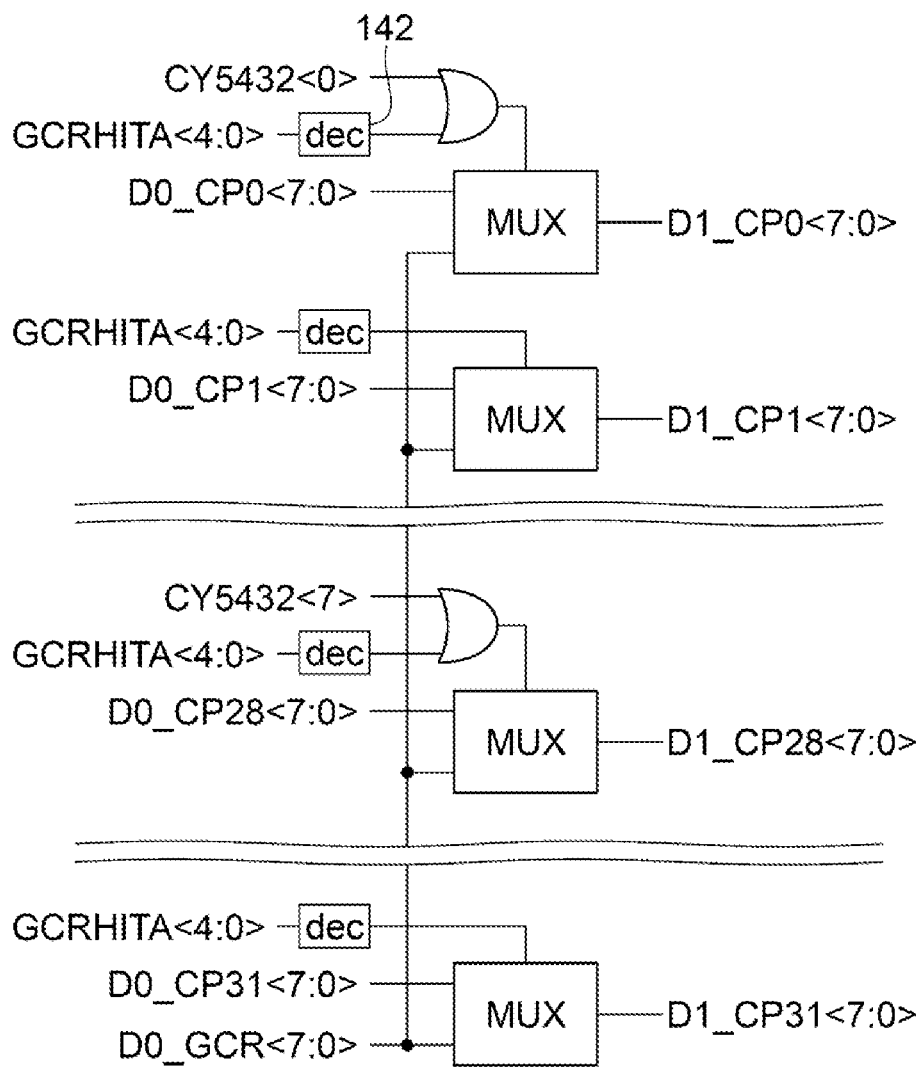

Further, by using a comparing and logic circuit 73A shown in FIG. 12 is used instead of the comparing and logic circuit 73 shown in FIG. 9, the number of necessary wires may be decreased. The comparing and logic circuit 73A shown in FIG. 12 outputs a hit signal GCRHITA<4:0> and swap signals SWHITA1<4:0> and SWHITA2<4:0> which are in binary format instead of a decoded hit signal GCRHIT<31:0> and swap signals SWHIT1<31:0> and SWHIT2<31:0>. In this case, as shown in FIG. 13, a decoder circuit 141 that decodes the hit signal GCRHITA<4:0> and the swap signals SWHITA1<4:0> and SWHITA2<4:0> which are in binary format are arranged immediately in front of the decoder circuits 80 to 832. As for the data-bus changing circuit, as shown in FIG. 14, a decoder circuit 142 that decodes the hit signal GCRHITA<4:0> in binary format is arranged immediately in front of the multiplexers 130 to 1331.

Next, a column access operation of the semiconductor memory device according to the present embodiment is described. In the following descriptions, a case where the normal column planes CP0 to CP31 have the configurations shown in FIGS. 5A and 6A is described as an example.

First, as shown in FIG. 15A, when the column selection signal CS0 is selected based on the column address CY<5:0>, since there is no column switch corresponding to the column selection signal CS0 in the normal column plane CP0, the mixed column plane GCR is selected instead of the normal column plane CP0 and the column selection signal CS0 is activated in the normal region NOM. As shown in FIG. 15B, when a bit line BL corresponding to the column selection signal CS48 is defective in the normal column plane CP0, as the column address CY<5:0> indicates the column selection signal CS48, the mixed column plane GCR is selected instead of the normal column plane CP0 and the column selection signal RCS16 is activated in the redundancy region RED. As shown in FIG. 15C, when a bit line BL corresponding to a column selection signal CS1 is defective in the normal column plane CP0, as the column address CY<5:0> indicates the column selection signal CS1, the value of the column address CY5 is reversed by activating the swap signal SWHIT1<0> as shown in HG 16A. With this configuration, the defective bit line in the normal column plane CP0 is accessed by the column selection signal CS33 in appearance. Therefore, when the column selection signal CS33 is selected based on the column address CY<5:0>, the mixed column plane GCR is selected instead of the normal column plane CP0 and the column selection signal RCS1 is activated in the redundancy region RED.

Figure 15D:
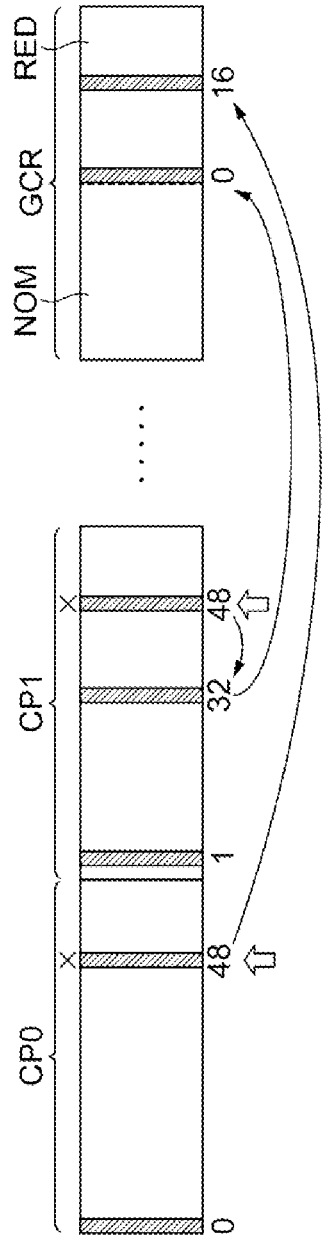
Figure 16B:
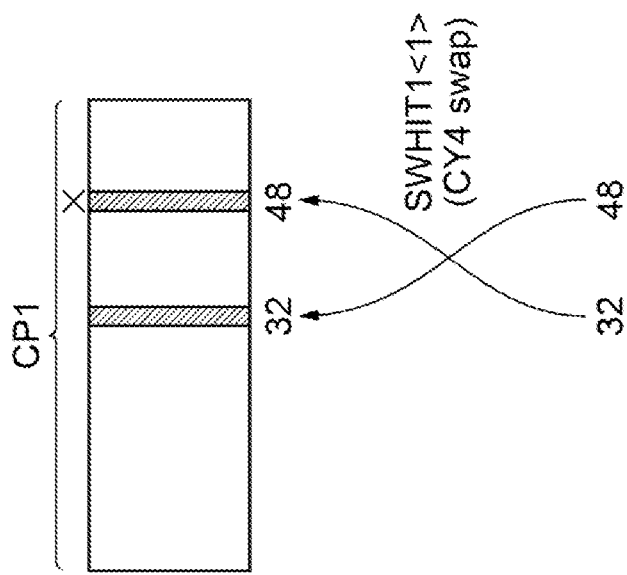
FIG. 16A to FIG. 16C are schematic diagrams for explaining a swap operation of column addresses.

As shown in FIG. 15D, when a bit line BL corresponding to the column selection signal CS48 is defective in both the normal column planes CP0 and CP1, as the column address CY<5:0> indicates the column selection signal CS48, the value of the column address CY4 is reversed by activating the swap signal SWHIT1<1> as shown in FIG. 16B. With this configuration, the defective bit line in the normal column plane CP1 is accessed by the column selection signal CS32 in appearance. Therefore, when the column selection signal CS32 is selected based on the column address CY<5:0>, the mixed column plane GCR is selected instead of the normal column plane CP1 and the column selection signal RCS0 is activated in the redundancy region RED. Further, when the column selection signal CS48 is selected based on the column address CY<5:0>, the mixed column plane GCR is selected instead of the normal column plane CP0 and the column selection signal RCS16 is activated in the redundancy region RED.

Figure 15E:
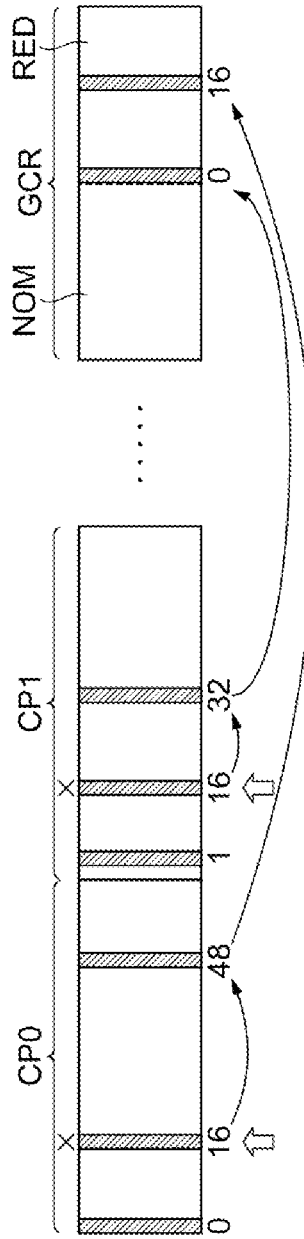
Figure 15F:
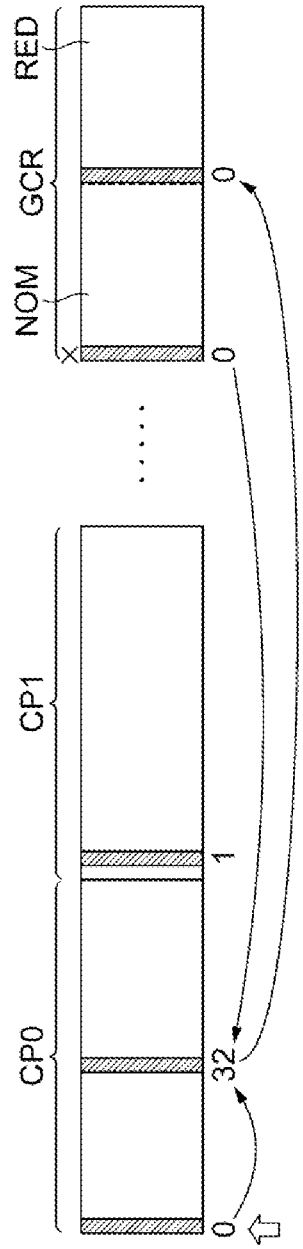
Figure 16A:
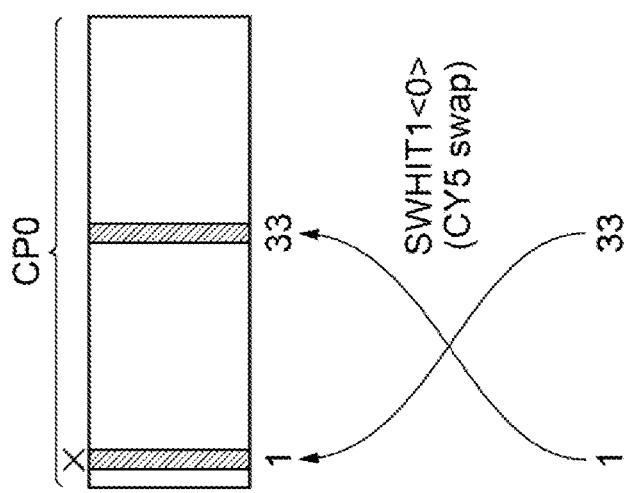
Figure 16C:
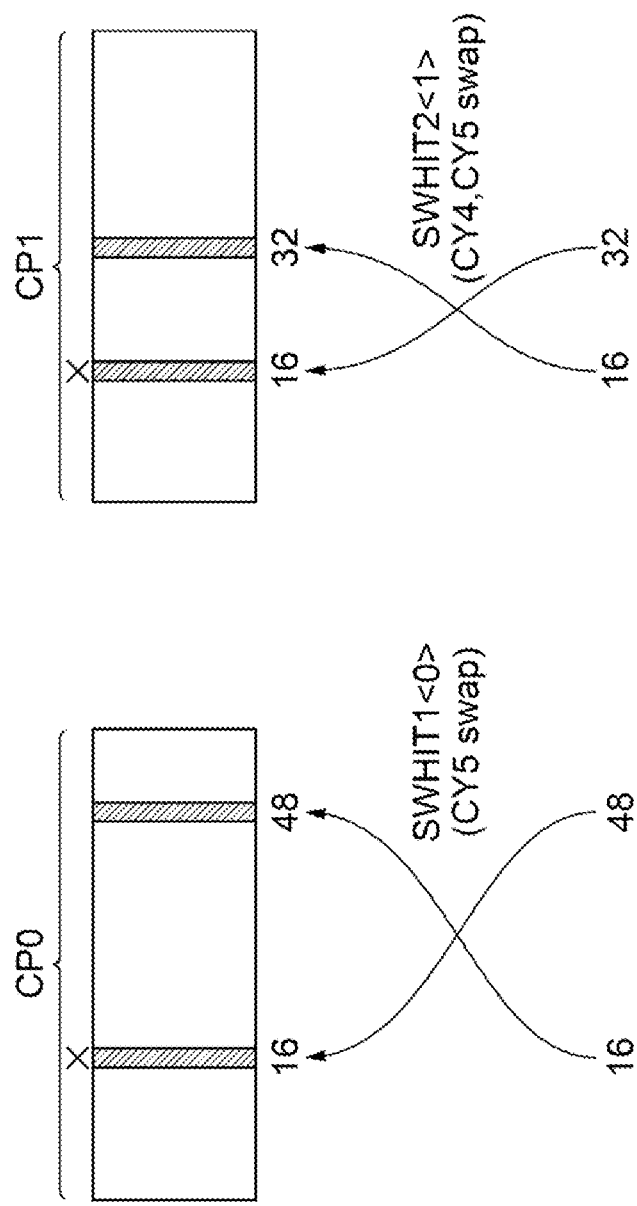

As shown in FIG. 15E, when a bit line BL corresponding to the column selection signal CS16 is defective in both the normal column planes CP0 and CP1, as the column address CY<5:0> indicates the column selection signal CS16, the value of the column address CY5 is reversed in the normal column plane CP0 by activating the swap signal SWHIT1<0> as shown in FIG. 16C, and the values of the column addresses CY4 and CY5 are reversed in the normal column plane CP1 by activating a swap signal SWHIT2<1>. With this configuration, the defective bit line in the normal column plane CP0 is accessed by the column selection signal CS48 in appearance, and the defective bit line in the normal column plane CP1 is accessed by the column selection signal CS32 in appearance. Therefore, when the column selection signal CS48 is selected based on the column address CY<5:0>, the mixed column plane GCR is selected instead of the normal column plane CP0 and the column selection signal RCS16 is activated in the redundancy region RED. Further, when the column selection signal CS32 is selected based on the column address CY<5:0>, the mixed column plane GCR is selected instead of the normal column plane CP1 and the column selection signal RCS0 is activated in the redundancy region RED.

As shown in HG 15F, when a bit line BL corresponding to the column selection signal CS0 in the normal region NOM in the mixed column plane GCR is defective, as the column address CY<5:0> indicates the column signal CS0, similarly to FIG. 16A, the value of the column address CY5 is reversed in the normal column plane CP0 by activating the swap signal SWHIT1<0>. With this configuration, column switches not included in the normal column plane CP0 are column switches corresponding to the column selection signal CS32. Therefore, when the column selection signal CS32 is selected based on the column address CY<5:0>, the mixed column plane GCR is selected instead of the normal column plane CP0 and the column selection signal RCS0 is activated in the redundancy region RED.

Figure 17:
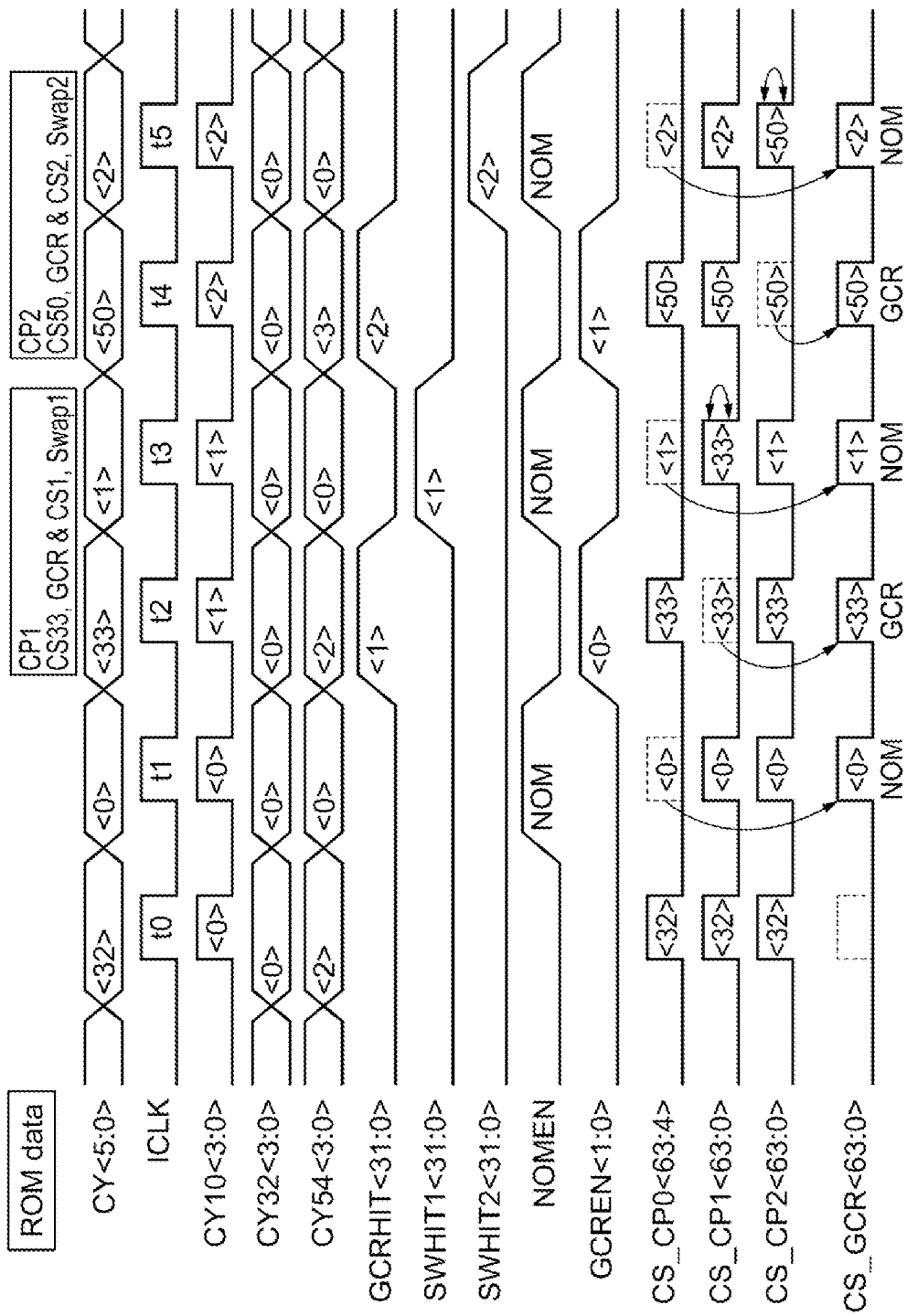
FIG. 17 is a timing chart for explaining an example of the column access operation.

FIG. 17 is a timing chart for explaining an example of a column access operation. In FIG. 17, a case where the normal column planes CP0 to CP31 have the configurations shown in FIGS. 5B and 6B is assumed. In the example shown in FIG. 17, when the column selection signals CS33 and CS1 are selected in the normal column plane CP1, data is written in the ROM circuit 72 so as to respectively activate the hit signal GCRHIT<1> and the swap signal SWHIT1<1>. Further, when the column selection signals CS50 and CS2 are selected in the normal column plane CP2, data is written in the ROM circuit 72 so as to respectively activate the hit signal GCRHIT<2> and the swap signal SWHIT2<2>.

First, when the value of the column address CY<5:0> to be supplied at a timing t0 where an internal clock signal ICLK is activated is <32>, none of the hit signal GCRHIT<31:0> and the swap signals SWHIT1<31:0> and SWHIT2<31:0> is activated. Therefore, the column selection signal CS32 is activated in each of the normal column planes CP0 to CP31. In this case, the mixed column plane GCR is not used. Next, when the value of the column address CY<5:0> to be supplied at a timing t1 is <0>, the enable signal NOMEN is activated. Therefore, the mixed column plane GCR is selected instead of the normal column plane CP0 and the column selection signal CS0 in the normal region NOM is activated. Next, when the value of the column address CY<5:0> to be supplied at a timing t2 is <33>, the hit signal GCRHIT<1> and the enable signal GCREN<0> are activated. With this configuration, the mixed column plane GCR is selected instead of the normal column plane CP1 and the column selection signal CS33 (=RCS1) in the redundancy region RED is activated. Next, when the value of the column address CY<5:0> to be supplied at a timing t3 is <1>, the enable signal NOMEN and the swap signal SWHIT1<1> are activated. With this configuration, the value of the column address CY5 is reversed in the normal column plane CP1, the mixed column plane GCR is selected instead of the normal column plane CP0, and the column selection signal CS1 in the normal region NOM is activated. Next, when the value of the column address CY<5:0> to be supplied at a timing t4 is <50>, the hit signal GCRHIT<2> and the enable signal GCREN<1> are activated. With this configuration, the mixed column plane GCR is selected instead of the normal column plane CP2 and the column selection signal CS50 (=RCS18) in the redundancy region RED is activated. Next, when the value of the column address CY<5:0> to be supplied at a timing t5 is <2>, the enable signal NOMEN and the swap signal SWHIT2<2> are activated. Accordingly, the values of the column addresses CY4 and CY5 are reversed in the normal column plane CP2, the mixed column plane GCR is selected instead of the normal column plane CP0, and the column selection signal CS2 in the normal region NOM is activated.

As described above, in the semiconductor memory device according to the embodiment of the present disclosure, since a part of bit lines BL that are originally supposed to be arranged in the normal column planes CP0 to CP31 are arranged in the normal region NOM in the mixed column plane GCR, even when the column size of the redundancy region RED in the mixed column plane GCR is considerably smaller than the column size of each of the normal column planes CP0 to CP31, the column size of the each of the normal column planes CP0 to CP31 and that of the mixed column plane GCR can be made equivalent to each other.

Although various embodiments have been disclosed in the context of certain preferred embodiments and examples, it will be understood by those skilled in the art that the scope of the present disclosure extends beyond the specifically disclosed embodiments to other alternative embodiments and/or uses of the embodiments and obvious modifications and equivalents thereof. In addition, other modifications which are within the scope of this disclosure will be readily apparent to those of skill in the art based on this disclosure. It is also contemplated that various combination or sub-combination of the specific features and aspects of the embodiments may be made and still fall within the scope of the disclosure. It should be understood that various features and aspects of the disclosed embodiments can be combined with or substituted for one another in order to form varying modes of the disclosed embodiments. Thus, it is intended that the scope of at least some of the present disclosure should not be limited by the particular disclosed embodiments described above.

The invention claimed is:

1. An apparatus comprising:
a plurality of first memory mats each having a plurality of first bit lines;
a second memory mat having a plurality of second bit lines and a plurality of third bit lines and
a column decoder circuit configured to:
when a column address is in a first address range, select a portion of the plurality of first memory mats excluding a first one of the plurality of first memory mats selected based on the column address and select the second memory mat instead of the first one of the plurality of first memory mats such that one of the plurality of second bit lines is selected; and
when the column address indicates a defective one of the plurality of first bit lines included in a second of the plurality of first memory mats, select a portion of the plurality of first memory mats excluding a second one of the plurality of first memory mats and select the second memory mat instead of the second one of the plurality of first memory mats such that one of the plurality of third bit lines is selected, wherein a number of first bit lines included in each of the first memory mats is smaller than an address space defined by the column address.

2. The apparatus of claim 1, wherein the first one of the plurality of first memory mats does not have a bit line corresponding to the one of the plurality of second bit lines.

3. The apparatus of claim 2, wherein the number of first bit lines included in each of the first memory mats is smaller than a sum of the second and third bit lines.

4. The apparatus of claim 2, wherein when the column address is in a second address range, the column decoder circuit is configured to select the plurality of first memory mats without selecting the second memory mat unless the column address indicates the defective one of the plurality of first bit lines.

5. The apparatus of claim 4, wherein, when a first address assigned to the defective one of the plurality of first bit lines is in the first address range, the column decoder circuit is configured to change a value of the column address supplied to the second one of the plurality of first memory mats when the column address indicates the first address.

6. The apparatus of claim 5, wherein the column decoder circuit is configured to change the value of the column address supplied to the second one of the plurality of first memory mats by inverting a logic level of one of bits constituting the column address.

7. The apparatus of claim 4, wherein, when both the defective one of the plurality of first bit lines included in the second one of the plurality of first memory mats and another defective one of the plurality of first bit lines included in a third one of the plurality of first memory mats are assigned to a second address, the column decoder circuit is configured to change a value of the column address supplied to the second and third ones of the plurality of first memory mats when the column address indicates the second address.

8. The apparatus of claim 7, wherein the column decoder circuit is configured to change the value of the column address supplied to the second one of the plurality of first memory mats by inverting a logic level of one of bits constituting the column address.

9. The apparatus of claim 8, wherein the column decoder circuit is configured to change the value of the column address supplied to the third one of the plurality of first memory mats by inverting logic levels of two of bits constituting the column address.

10. An apparatus comprising:
a memory cell array divided into a plurality of memory mats including a plurality of first memory mats and a second memory mat;
a plurality of data buses each assigned to an associated one of the plurality of memory mats; and
a plurality of column switch groups each assigned to an associated one of the plurality of memory mats,
wherein each of the plurality of memory mats includes a plurality of bit lines,
wherein each of the plurality of column switch groups is configured to couple a selected one of the plurality of bit lines based on a column address to an associated one of the plurality of data buses,
wherein each of the plurality of first memory mats lacks at least one bit line to be selected by a predetermined value of the column address,
wherein the predetermined value assigned to each of the plurality of first memory mats is different from one another,
wherein a bit line included in the second memory mat is selected when the column address indicates the predetermined value assigned to one of the plurality of first memory mats, and wherein a number of bit lines included in each of the plurality of first memory mats is smaller than an address space defined by the column address.

11. The apparatus of claim 10,
wherein the plurality of bit lines included in each of the plurality of first memory mats are divided into a first group selected when a value of the column address is in a first address range and a second group selected when a value of the column address is in a second address range, and
wherein the predetermined value assigned to each of the plurality of first memory mats is in the first address range.

12. The apparatus of claim 11, wherein each of the column switch groups assigned to the plurality of first memory mats is configured to couple the selected one of the plurality of bit lines to the associated one of the plurality of data buses when the value of the column address is in the second address range.

13. The apparatus of claim 11, wherein the second memory mat further includes a plurality of spare bit lines for substituting defective ones of the bit lines.

14. An apparatus comprising:
a plurality of memory mats each having a plurality of bit lines, the plurality of memory mats including a plurality of first memory mats and a second memory mat; and
a column decoder circuit configured to:
when a column address is in a first address range, select one of the bit lines in each of the plurality of first memory mats except for one of the plurality of first memory mats and select one of the bit lines in the second memory mat; and
when the column address is in a second address range, select one of the bit lines in each of the plurality of first memory mats,
wherein a number of bit lines included in each of the first memory mats is smaller than an address space defined by the column address.

15. The apparatus of claim 14,
wherein the column decoder circuit is configured to, when the column address is a first value included in the first address range, select a first one of the bit lines in each of the plurality of first memory mats except for a first one of the plurality of first memory mats and select a first one of the bit lines in the second memory mat, and
wherein the first one of the plurality of first memory mats lacks a bit line corresponding to the first value of the column address.

16. The apparatus of claim 15,
wherein the column decoder circuit is configured to, when the column address is a second value included in the first address range, select a second one of the bit lines in each of the plurality of first memory mats except for a second one of the plurality of first memory mats and select a second one of the bit lines in the second memory mat, and
wherein the second one of the plurality of first memory mats has a bit line corresponding to the first value of the column address and lacks a bit line corresponding to the second value of the column address.

17. The apparatus of claim 16,
wherein the column decoder circuit is configured to, when the column address is a third value included in the second address range, select a third one of the bit lines in each of the plurality of first memory mats, and
wherein the second memory mat lacks a bit line corresponding to the third value of the column address.

18. The apparatus of claim 17, wherein the second memory mat further includes a plurality of spare bit lines for substituting defective ones of the bit lines included in the plurality of first memory mats.

19. The apparatus of claim 14,
wherein the plurality of memory mats further includes a plurality of third memory mats each having a plurality of bit lines corresponding to all the address space of the column address, and
wherein the column decoder circuit is configured to, when the column address is in the first address range, select one of the bit lines in each of the plurality of first memory mats except for one of the plurality of first memory mats, select one of the bit lines in the second memory mat, and select one of the bit lines in each of the plurality of third memory mats.

\* \* \* \* \*